US011113567B1

(12) United States Patent
Durand et al.

(10) Patent No.: US 11,113,567 B1
(45) Date of Patent: Sep. 7, 2021

(54) PRODUCING TRAINING DATA FOR MACHINE LEARNING

(71) Applicant: Amazon Technologies, Inc., Seattle, WA (US)

(72) Inventors: Jean-Guillaume Durand, Seattle, WA (US); Pradeep Krishna Yarlagadda, Issaquah, WA (US); Ishay Kamon, Redmond, WA (US); Francesco Callari, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 117 days.

(21) Appl. No.: 16/259,783

(22) Filed: Jan. 28, 2019

(51) Int. Cl.
*G06K 9/62* (2006.01)
*G01S 19/03* (2010.01)
*G06N 20/00* (2019.01)

(52) U.S. Cl.
CPC ............ *G06K 9/6256* (2013.01); *G01S 19/03* (2013.01); *G06N 20/00* (2019.01)

(58) Field of Classification Search
CPC ............ G06K 9/00624; G06K 9/0063; G06K 9/00637; G06K 9/00644; G06K 9/00651; G06K 9/00657; G06K 9/00664; G06K 9/006; G06K 9/00671; G06K 9/00677; G06K 9/00711; G06K 9/00718; G06K 9/00771; G06K 9/00778; G06K 9/00785; G06K 9/00791; G06K 9/3241; G06K 9/325; G01C 21/20; H04L 29/08657; H04M 1/72572; H04W 4/02; H04W 4/024; H04W 4/029
USPC ...................................................... 382/159
See application file for complete search history.

(56) References Cited

U.S. PATENT DOCUMENTS

| | | | |
|---|---|---|---|
| 2011/0044543 A1* | 2/2011 | Nakamura ......... | G06K 9/00798 382/190 |
| 2019/0164007 A1* | 5/2019 | Liu ...................... | G06K 9/0063 |
| 2019/0258878 A1* | 8/2019 | Koivisto .................. | G05D 1/00 |

OTHER PUBLICATIONS

Fischler, M. and Bolles, R., "Random Sample Consensus: A Paradigm for Model Fitting with Applications to Image Analysis and Automated Cartography," Communications of the ACM, vol. 24, No. 6, pp. 381-395, 1981, 15 pages.

(Continued)

*Primary Examiner* — Huy C Ho
(74) *Attorney, Agent, or Firm* — Athorus, PLLC

(57) ABSTRACT

Described are systems and methods for generating training data that is used to train a machine learning system to detect moving objects represented in sensor data. The system and methods utilize position data received from a target vehicle to determine data points within sensor data that represents that target vehicle. For example, a station at a known location may receive Automatic Dependent Surveillance-Broadcast ("ADS-B") data (position data) corresponding to a target vehicle that is within the field of view of a station sensor, such as a camera. The position data may then be correlated with the sensor data and projected into the sensor data to determine data points within the sensor data that represent the target vehicle. Those data points are then labeled to indicate the location, size, and/or shape of the target vehicle as represented in the sensor data, thereby producing training that may be provided to train a machine learning algorithm or system to detect moving objects, such as aircraft.

20 Claims, 9 Drawing Sheets

(56) References Cited

OTHER PUBLICATIONS

Lucas, B.D. and Kanade, T., "An Iterative Image Registration Technique with an Application to Stereo Vision," in Proceedings of the 7th International Joint Conference on Artificial Intelligence—vol. 2, IJCAI'81, (San Francisco, CA, USA), pp. 674-679, Morgan Kaufmann Publishers Inc., 1981, 6 pages.
Shi, J. and Tomasi, C., "Good Features to Track," in IEEE CVPR, pp. 593-600, 1994, 8 pages.

* cited by examiner

PRODUCING TRAINING DATA FOR MACHINE LEARNING

BACKGROUND

Machine learning is the study of algorithms and statistical models that computing systems use to improve performance on a specific task. Machine learning algorithms build a mathematical model from sample data, known as "training data" or "training inputs" to make predications or decisions without being explicitly programmed to perform the specific task. Machine learning algorithms are used in wide variety of applications from email filtering, network detection, and computer vision, where it is infeasible to develop an algorithm or specific instructions for performing the task.

One of the drawbacks of using machine learning, for example for computer vision, is the production of the training data. For example, production of training data to train a machine learning system to detect moving objects in image data is currently an expensive process requiring humans to manually review and label portions of the image data that represent the moving object. This process is time consuming and error prone, especially for long-distance detection where the object is often only a few pixels in the image, which may include millions of pixels. It is currently estimated that it takes approximately eight-hundred human hours to label one hour of image data.

DETAILED DESCRIPTION

Figure 1:
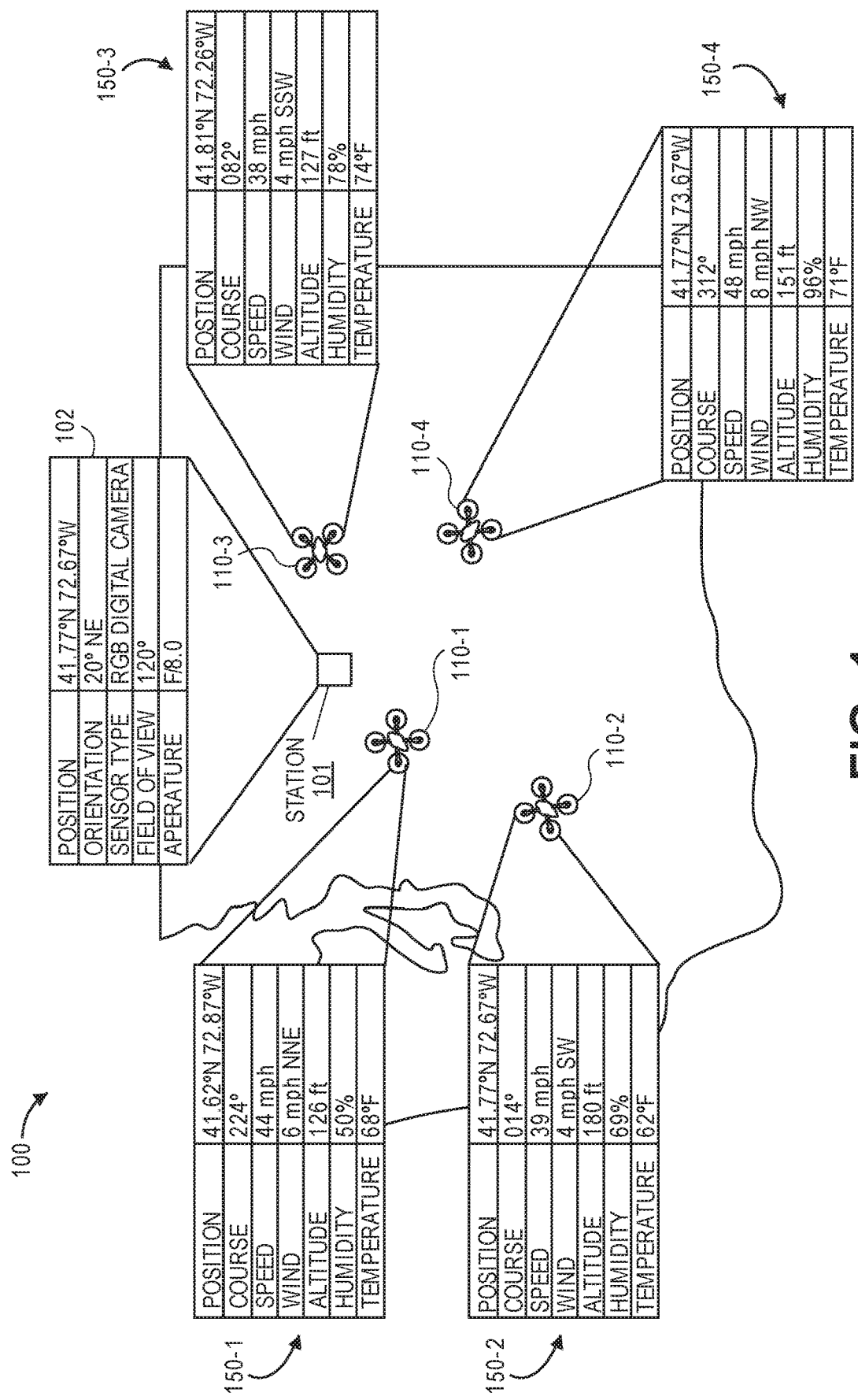
FIG. 1 is a view of one example system for producing training data to train a machine learning system to detect moving objects in sensor data, in accordance with implementations of the present disclosure.

As is set forth in greater detail below, the present disclosure is directed to producing training data to train a machine learning system, such as a supervised machine learning system, to detect moving objects in sensor data. More specifically, the system and methods discussed herein utilize position data received from a target vehicle to determine data points within sensor data that represents that target vehicle. For example, a station at a known position may receive Automatic Dependent Surveillance-Broadcast ("ADS-B") data (position data) corresponding to a target vehicle that is within the field of view of a station sensor, such as a camera, that is at a known position and orientation. The position data may then be correlated with the sensor data and projected into the sensor data to determine data points within the sensor data that represent the target vehicle. Those data points may then be labeled to indicate the location, size, and/or shape of the target vehicle as represented in the sensor data, thereby producing the training data or training input that may be provided to train a machine learning algorithm or system to detect moving objects, such as aircraft, in sensor data.

As is known, ADS-B is a surveillance technology in which an aircraft determines its position via satellite navigation (e.g., a Global Navigation Satellite System ("GNSS"), such as a Global Positioning System ("GPS")) and periodically broadcasts it, enabling the aircraft to be tracked. The current ADS-B system uses 1090 MHz and broadcasts GNSS position (latitude, longitude, altitude), pressure, altitude, call sign (identifier), track speed, and ground speed of the vehicle.

As one specific example, the station may be at a fixed and known location on earth and include one or more cameras (sensors), such as Red, Green, Blue (RGB) digital cameras that produce images or video of a scene within a field of view of the camera, generally referred to herein as sensor data. The station may also include an antenna, such as a Digital Video Broadcast-Terrestrial ("DVB-T") antenna, that is operable to receive ADS-B data that is transmitted by a target vehicle within the field of view of the camera. The ADS-B data may be received directly from the target, via satellite, or via any other means of communication. In some implementations, the ADS-B data may be stored or recorded by the target vehicle and provided to the station at any later point in time (e.g., after the target vehicle has landed).

The station may correlate the image data from the camera and the received ADS-B data based on timestamps included in the GNSS position data. The ADS-B data may then be used to project the position of the target vehicle into the image data to determine one or more pixels (data points) that represent the target vehicle in the image data. Those pixels may then be labeled as representative of the target vehicle and the labeled image data may be provided as training data to train a machine learning system.

In still another example, the station may be included on a second vehicle and the known position of the station may corresponds to a GNSS position of the second vehicle and the orientation of the camera may corresponding to a heading of the second vehicle. Similar to a fixed location station, the station included on the second vehicle receives position data from the target vehicle and uses that data to determine pixels in the image data that are representative of the target vehicle. Those pixels may then be labeled as representative of the target vehicle and the labeled image data provided as training data to train a machine learning system. Similar to the prior example, the position data may be received in real-time or near real-time from the target vehicle or stored and provided at any later point in time.

In still another example, the target vehicle may include a second station that is configured to generate image data of the second vehicle and receive position data, such as ADS-B data, generated by the second vehicle. In such an example, the two stations may generate training data using the described implementations that is provided to a machine learning system to train the machine learning system to detect objects in sensor data, such as image data.

Referring to FIG. 1, a view of one example system 100 for generating training data for a machine learning system in accordance with implementations of the present disclosure is shown. As is shown in FIG. 1, a plurality of aerial vehicles 110-1, 110-2, 110-3, 110-4 are engaged in flight along various routes. The aerial vehicles 110-1, 110-2, 110-3, 110-4 are configured to capture data 150-1, 150-2, 150-3, 150-4 regarding the aerial vehicles 110-1, 110-2, 110-3, and 110-4, including but not limited to information or data regarding positions, altitudes, courses, speeds, climb or descent rates, turn rates, accelerations, wind velocities, humidity levels and temperatures, pressures, ground speed, etc., using one or more sensors. The aerial vehicles are also configured to periodically broadcast at least some of the information, such as the information included in ADS-B broadcasts (e.g., GNSS position, pressure, altitude, call sign or identifier, track speed, ground speed).

For example, as is shown in the information or data 150-1 of FIG. 1, the aerial vehicle 110-1 has a current position of 41.62° N 72.87° W, is traveling on a course of 224° and at a speed of 44 miles per hour (mph), in winds of 6 mph out of the northeast, at an altitude of 126 feet, and in air having 50 percent humidity and a temperature of 68 degrees Fahrenheit (° F.). The information or data 150-2 of FIG. 1 indicates that the aerial vehicle 110-2 has a current position of 41.77° N 72.67° W, is traveling on a course of 014° and at a speed of 39 mph, in winds of 4 mph out of the southwest, at an altitude of 180 feet, and in air having 69 percent humidity and a temperature of 62° F. The information or data 150-3 of FIG. 1 indicates that the aerial vehicle 110-3 has a current position of 41.81° N 72.26° W, is traveling on a course of 082° and at a speed of 38 mph, in winds of 4 mph out of the south southwest, at an altitude of 127 feet and in air having 78% humidity and a temperature of 74° F. Finally, the information or data 150-4 of FIG. 1 indicates that the aerial vehicle 110-4 has a current position of 41.77° N 73.67° W, is traveling on a course of 312° and at a speed of 48 mph, in winds of 8 mph out of the northwest, at an altitude of 151 feet and in air having 96 percent humidity and a temperature of 71° F.

In accordance with the present disclosure, the aerial vehicles 110-1, 110-2, 110-3, 110-4 may be configured to periodically broadcast some or all of the data 150-1, 150-2, 150-3, 150-4 and/or provide the data to a data processing system, such as station 101. The information or data 150-1, 150-2, 150-3, 150-4 may be broadcast and/or provided to the station 101 either in real time or in near-real time while the aerial vehicles 110-1, 110-2, 110-3, 110-4 are in transit, or upon their arrival at their respective destinations.

In addition to receiving position data from various target vehicles, the station 101 may also maintain known position data and information regarding the station and/or sensor(s) at the station and produce sensor data, as discussed herein. In this example, the station 101 maintains sensor information 102 indicating the position of the sensor as 41.77° N 72.67° W, that the sensor is oriented 20° NE, is an RGB digital camera with a field of view of 120° and an aperture of f/8.0.

Figure 2:
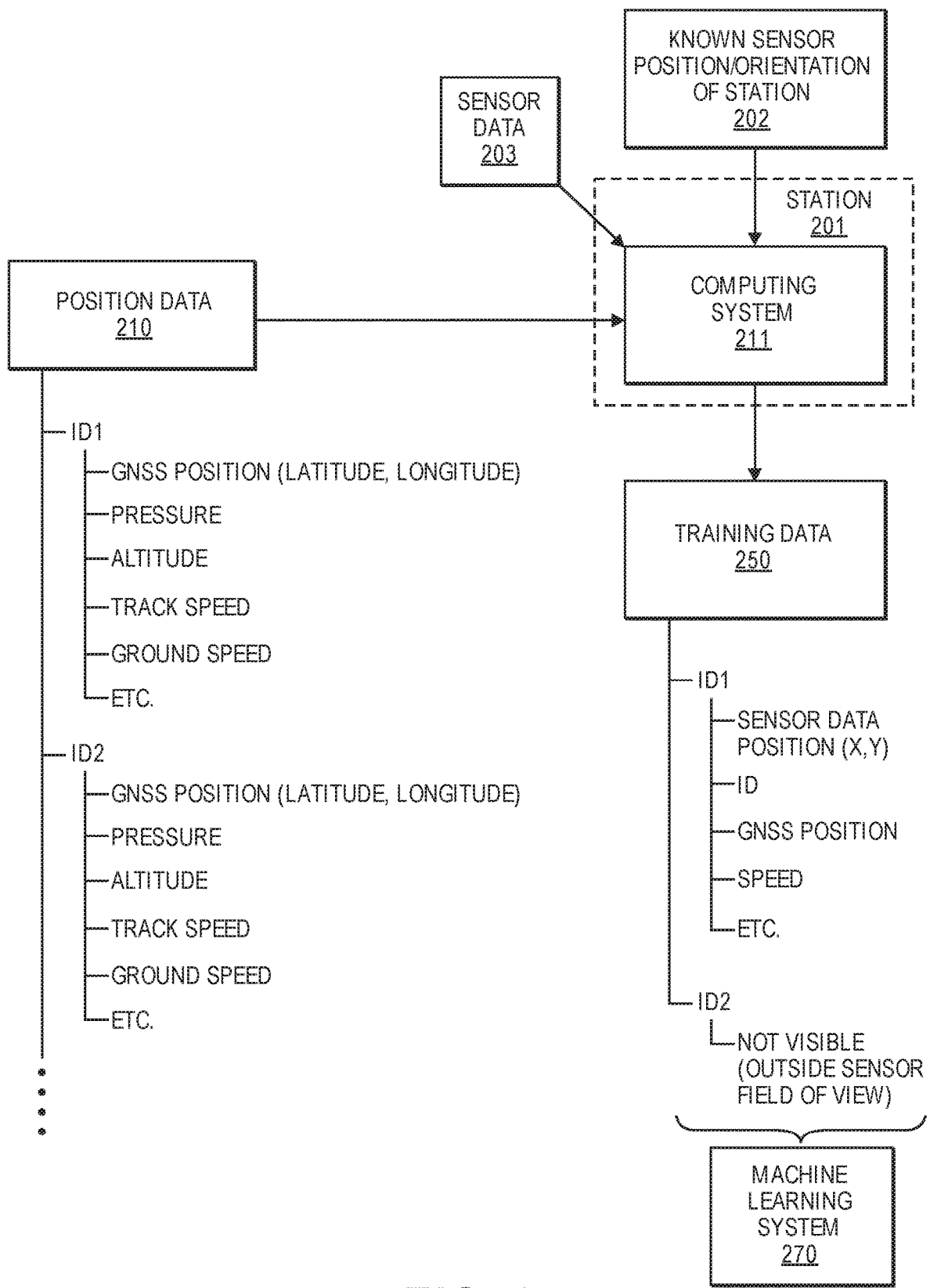
FIG. 2 is a diagram of one example system for producing training data, in accordance with implementations of the present disclosure.

Referring to FIG. 2, illustrated is an example block diagram of data that may be provided to a computing system 211 at a station 201 and used to produce training data 250 in accordance with described implementations. As illustrated, one or more target vehicles may provide position data 210 in real-time, near real-time, or at any later point in time (e.g., after the target vehicle has landed). Position data 210 from each target vehicle may include, among other data, an identifier that identifies the target vehicle, GNSS position (latitude, longitude) of the target vehicle, pressure of the target vehicle, altitude of the target vehicle, track speed of the target vehicle, ground speed of the target vehicle, etc.

Any number of target vehicles may provide or broadcast position data that is received by the computing system of the station 201. As noted above, the position data 210 may be provided directly from the target vehicle(s) to the computing system 211 and/or broadcast and accessible by the computer system 211.

The computing system 211 of the station 201 may also receive or maintain known sensor information 202 indicating the position, orientation, type, etc., of the sensor(s) at the station. Sensors may include any type of sensors that can generate sensor data representative of a moving object, such as a target vehicle. For example, sensors may include, but are not limited to, digital cameras, such as RGB and/or RGB-depth cameras, Radio Detection And Ranging (RADAR) sensors, Light Detection And Ranging (LiDAR) sensors, Sound Navigation and Ranging (SONAR) sensors, infrared, etc. During operation, the computing system 211 receives sensor data 203 from the sensor(s) at the station 201.

To produce training data 250, the computing system 211 correlates the sensor data with the position data of a target vehicle based on, for example, the GNSS timestamp corresponding to each of the sensor data and the position data of the target vehicle. The position data received from the target vehicle(s) is then transformed into the sensor format such that the GNSS position is projected into the sensor data coordinates to indicate data points (e.g., pixels) of the sensor data that corresponds to the position of the target vehicle. The data points are labeled and training data 250 is produced that includes the target vehicle identifier, the determined data points within the sensor data (x, y), the GNSS position of the target vehicle, the speed of the target vehicle, etc. This may be done for each target vehicle that is within the field of view of the sensor at the station. If position data for a target vehicle is received at the station for a target vehicle that is not in the field of view, the training data may indicate that the target vehicle is not represented in the sensor data.

A machine learning system 270 may be fully trained using a substantial corpus of training data 250 generated using the disclosed implementations. A machine learning system trained using training data 250 generated with the disclosed implementations may be utilized to detect, in real-time or near real-time, moving objects represented in sensor data, such as image data. Such detection may be beneficial for autonomous object detection and avoidance, such as in an unmanned aerial vehicle (UAV) navigation. For example, after the machine learning system 270 has been trained, the machine learning system 270 may receive sensor data from a sensor of an operating aerial vehicle and determine if there is an object within the field of view of the sensor.

In some implementations, the machine learning system 270 may reside and/or be operated on one or more computing devices or machines provided onboard one or more of the aerial vehicles, and/or other vehicles. In other implementations, the machine learning system 170 may reside and/or be operated on one or more centrally located computing devices or machines. The machine learning system 270 may receive sensor data from one or more vehicles, process the sensor data, and determine if a moving object is within a field of view of the aerial vehicle from which the sensor data was received. Alternatively, once the machine learning system 270 is trained, the machine learning system 270 may be used to program computing devices or machines of aerial vehicles in a fleet with a model that detects moving objects in sensor data generated by one or more sensors on each aerial vehicle in real time or in near-real time.

Those of ordinary skill in the pertinent arts will recognize that any type or form of machine learning system (e.g., hardware and/or software components or modules) may be utilized in accordance with the present disclosure. Likewise, while the implementations discussed herein focus primarily on aerial vehicles, the disclosed implementations may also be used to produce training data for machine learning systems used with ground based vehicles, and/or water based vehicles.

Figure 3:
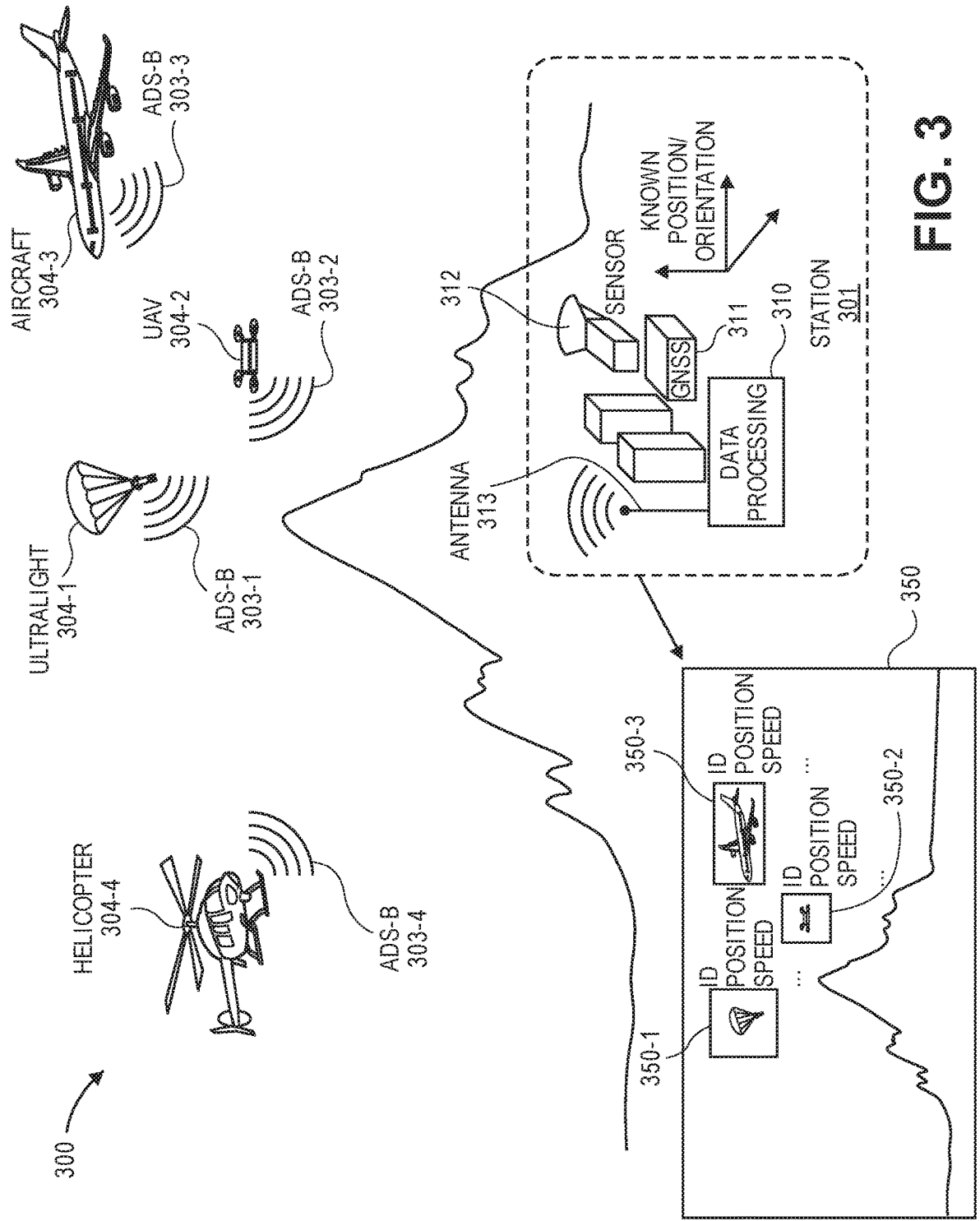
FIG. 3 is a block diagram of one example system for producing training data to train a machine learning system to detect moving objects in sensor data, in accordance with implementations of the present disclosure.

FIG. 3 is a block diagram of one example system for producing training data to train a machine learning system to detect moving objects in sensor data, in accordance with implementations of the present disclosure. In this example, the environment 300 includes four target vehicles, an ultralight 304-1, an unmanned aerial vehicle (UAV) 304-2, an aircraft 304-3, and a helicopter 304-4. In this example, the position data is included in ADS-B data 303-1, 303-2, 303-3, and 303-4 that is periodically broadcast by each of the target vehicles as they aerially navigate along one or more routes.

The station 301 includes a GNSS 311, a data processing system 310, an antenna 313, such as a DVB-T antenna, and one or more sensors 312, such as a camera. In this example, the known position of the station 301 and the sensor 312 is based at least in part on GNSS data provided by the GNSS 311. Likewise, the orientation, field of view, and/or other information about the sensor 312 is also known by the data processing system 310 of the station 301. While the example illustrated in FIG. 3 shows a single sensor, in other implementations, the station 301 may include any number of sensors. For example, multiple sensors 312 may be included at the station, each with different orientations such that the multiple sensors provide a 360-degree field of view around the station. In other implementations, one or more sensors may be positioned on a movable gimbal or turret such that the orientation may be adjusted so that target vehicles are maintained in the field of view of the sensor 312 at the station 301.

Using the disclosed implementations, the data processing system 310 utilizes sensor data generated by the sensor 312 and position data 303 received from the target vehicles 304, and/or position data that is stored and later provided, to produce training data. Training data may be visually represented as training data 350 with pixels representative of each target vehicle labeled, along with position information for each target vehicle that is within the field of view of the sensor 312 and represented in the sensor data. In this example, the training data 350 includes labels 350-1, 350-2, 350-3 indicating the pixels (data points) of the training data representative of the target vehicles within the field of view of the sensor. Objects closer to the vehicle will be represented by a larger number of pixels, while objects that are farther away will be represented by a smaller number of pixels.

Figure 4:
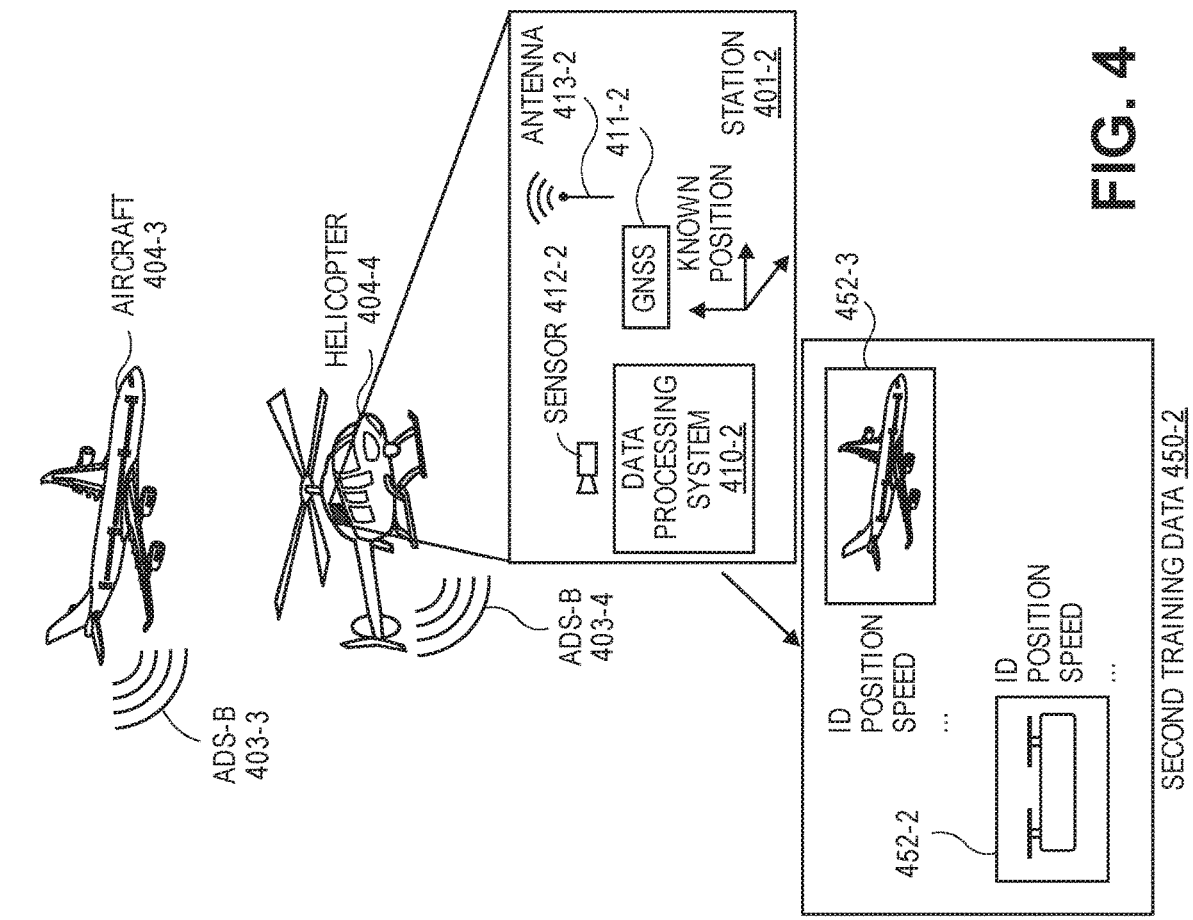
FIG. 4 is a block diagram of another example system for producing training data to train a machine learning system to detect moving objects in sensor data, in accordance with implementations of the present disclosure.
Figure 4:
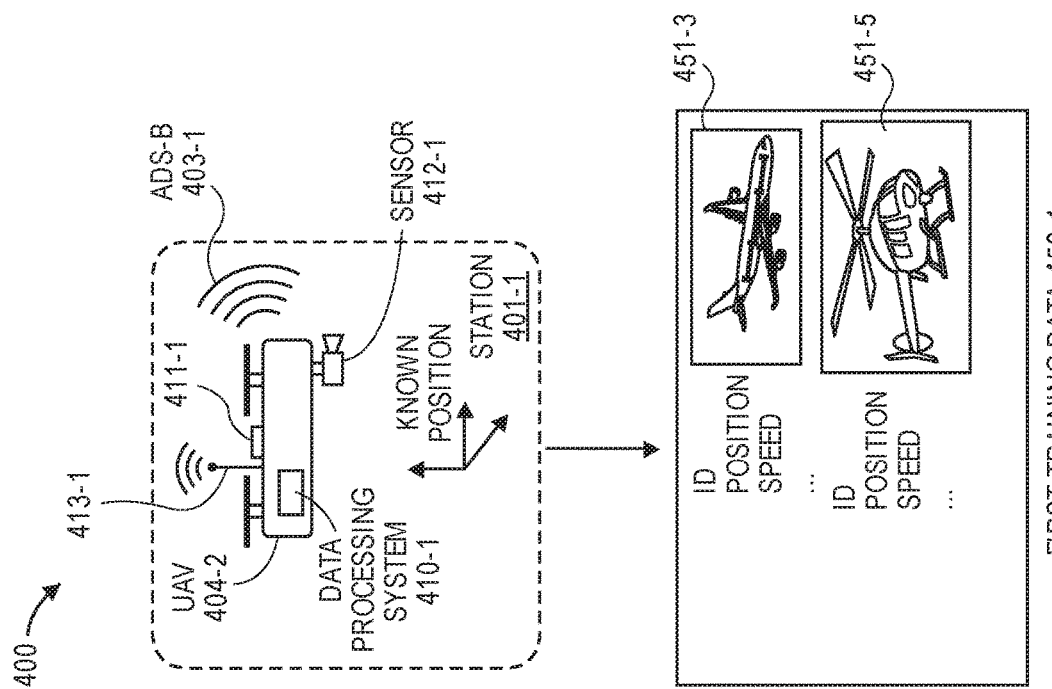

FIG. 4 is a block diagram of another example system for producing training data to train a machine learning system to detect moving objects in sensor data, in accordance with implementations of the present disclosure. In this example, the environment 400 includes a UAV 404-2, an aircraft 404-3, and a helicopter 404-4. The UAV 404-2 includes a first station 401-1 that includes a data processing system 410-1, GNSS 411-1, antenna 413-1, and sensor 412-1. In this example, the known position of the first station 401-1 is the GNSS position of the UAV 404-2 and the orientation of the sensor may be the heading of the UAV 404-2. Like the discussion above with respect to FIG. 3, the station 401-1 generates sensor data using the sensor 412-2 and receives position data, such as ADS-B data 403-3, 403-4 corresponding to each of the target vehicles 404-3, 404-4. The data processing system 410-1 processes the first sensor data and the received position data to produce first training data 450-1 that includes labels 451-3, 451-4 for the data points (e.g., pixels) corresponding to the target vehicles represented in the collected sensor data.

In this example, one of the target vehicles, namely helicopter 404-4 includes a second station 401-2 that includes a second data processing system 410-2, second GNSS 411-2, second antenna 413-2, and a second one or more sensors 412-2. Like the first station 401-1, the known position of the second station 401-2 is the position of the vehicle 404-4 on which the station is located and as determined, for example, by the GNSS 411-2. In this example, the sensor 412-2 generates second sensor data for the second station 401-2 and receives position data, such as ADS-B 403-1, 403-4 of each target vehicle, in this example UAV 404-1 and aircraft 404-3. The second data processing system 410-2 processes the second sensor data and the received position data to produce second training data 450-2 that includes labels 452-2 and 452-3 for the data points (e.g., pixels) corresponding to the target vehicles represented in the collected sensor data.

Each of the first training data 450-1 and second training data 450-2 is provided to train a machine learning system so that the trained machine learning system can detect objects represented in sensor data in real-time or near real-time. As will be appreciated, training data, such as first training data and/or second training data may be generated periodically, such as every frame of a digital video, ever second, etc. As such, a large corpus of training data may be quickly generated using one or more stations that collect sensor data and receive position data of target vehicles represented in the sensor data. Likewise, even after a machine learning system has been trained and is operational in a vehicle, the vehicle may also maintain a station and continue to generate training data that is provided back to the machine learning system to continue to improve the machine learning of the system.

Figure 5:
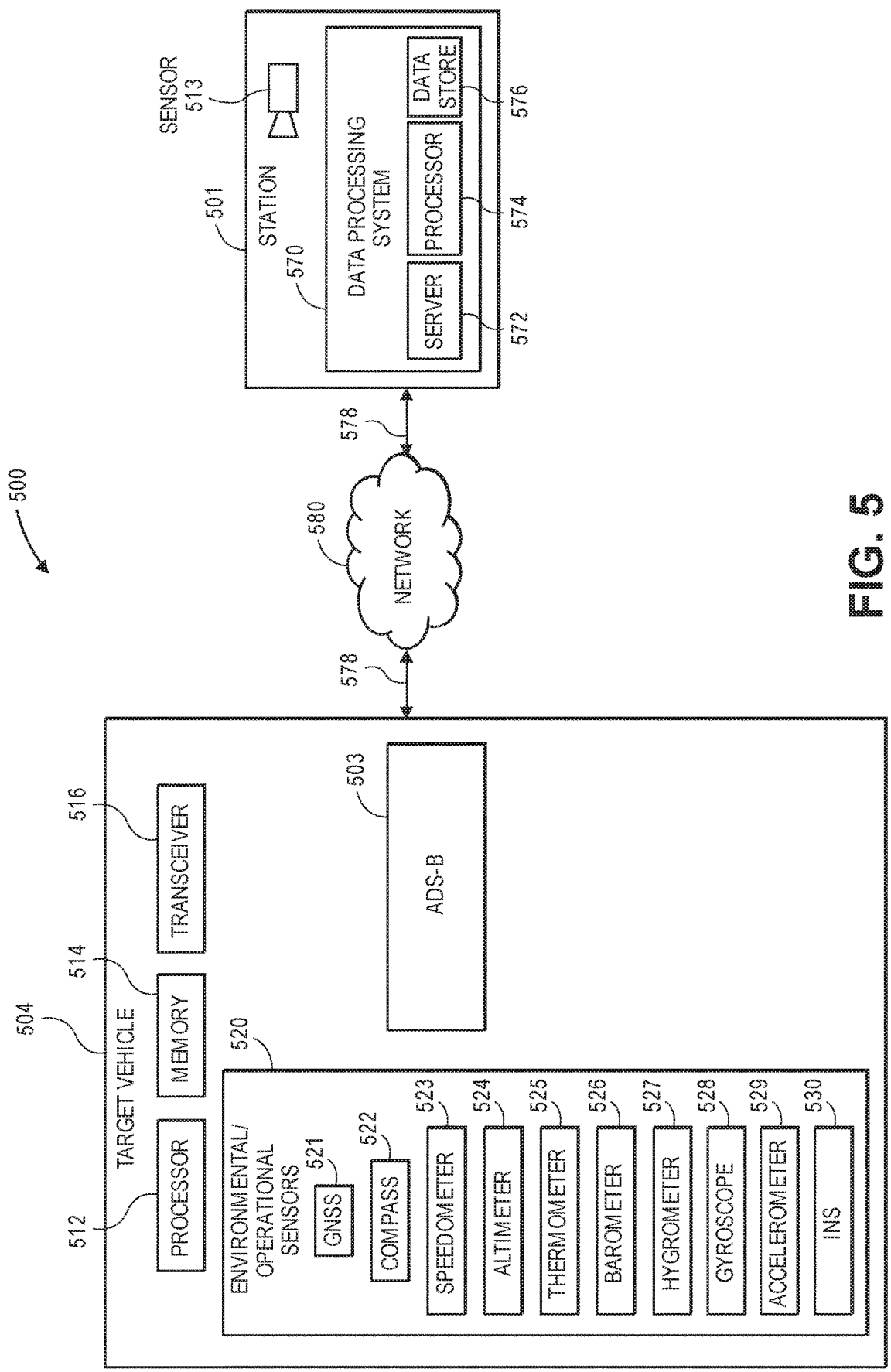
FIG. 5 is a block diagram of example components of a system for producing training data to train a machine learning system to detect moving objects in sensor data, in accordance with implementations of the present disclosure.

Referring to FIG. 5, a block diagram of components of one system 500 for generating training data for a machine learning system to train the machine learning system to detect moving objects in sensor data, in accordance with implementations of the present disclosure. The target vehicle 504 includes a processor 512, a memory or storage component 514 and a transceiver 516, as well as a plurality of environmental or operational sensors 520, and an ADS-B component 503.

The processor 512 may be configured to perform any type or form of computing function, including but not limited to the execution of one or more machine learning algorithms or techniques. For example, the processor 512 may control any aspects of the operation of the target vehicle 504 and the one or more computer-based components thereon, including but not limited to the transceiver 516, the environmental or operational sensors 520, and/or the ADS-B component 503. The target vehicle 504 may likewise include one or more control systems that may generate instructions for conducting operations thereof, e.g., for operating one or more rotors, motors, rudders, ailerons, flaps or other components provided thereon. Such control systems may be associated with one or more other computing devices or machines, and may communicate with the data processing system 570 or one or more other computer devices over the network 580, through the sending and receiving of digital data. The target vehicle 504 further includes one or more memory or storage components for storing any type of information or data, e.g., instructions for operating the target vehicle, or information or data captured by one or more of the environmental or operational sensors 520.

The transceiver 516 may be configured to enable the target vehicle 504 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 580 or directly.

The environmental or operational sensors 520 may include any components or features for determining one or more attributes of an environment in which the target vehicle 504 is operating, or may be expected to operate, including extrinsic information or data or intrinsic information or data. As is shown in FIG. 5, the environmental or operational sensors 520 may include, but are not limited to, a GNSS receiver or sensor 521, a compass 522, a speedometer 523, an altimeter 524, a thermometer 525, a barometer 526, a hygrometer 527, a gyroscope 528, an accelerometer 529, or an inertial navigation system ("INS") 530. The GNSS sensor 521 may be any device, component, system or instrument adapted to receive signals (e.g., trilateration data or information) relating to a position of the target vehicle 504 from one or more GNSS satellites of a GNSS network (not shown). The compass 522 may be any device, component, system, or instrument adapted to determine one or more directions with respect to a frame of reference that is fixed with respect to the surface of the Earth (e.g., a pole thereof). The speedometer 523 may be any device, component, system, or instrument for determining a speed or velocity of the target vehicle 504, and may include related components (not shown) such as pitot tubes, accelerometers, or other features for determining speeds, velocities, or accelerations.

The altimeter 524 may be any device, component, system, or instrument for determining an altitude of the target vehicle 504, and may include any number of barometers, transmitters, receivers, range finders (e.g., laser or radar) or other features for determining heights. The thermometer 525, the barometer 526 and the hygrometer 527 may be any devices, components, systems, or instruments for determining local air temperatures, atmospheric pressures, or humidities within a vicinity of the target vehicle 504. The gyroscope 528 may be any mechanical or electrical device, component, system, or instrument for determining an orientation, e.g., the orientation of the target vehicle 504. For example, the gyroscope 528 may be a traditional mechanical gyroscope having at least a pair of gimbals and a flywheel or rotor. Alternatively, the gyroscope 528 may be an electrical component such a dynamically tuned gyroscope, a fiber optic gyroscope, a hemispherical resonator gyroscope, a London moment gyroscope, a microelectromechanical sensor gyroscope, a ring laser gyroscope, or a vibrating structure gyroscope, or any other type or form of electrical component for determining an orientation of the target vehicle 504. The accelerometer 529 may be any mechanical or electrical device, component, system, or instrument for measuring proper acceleration, which is the acceleration experienced relative to freefall and is the acceleration with respect to the target vehicle 504. The INS 530 is a mechanical or electrical device, component, system, or instrument that uses a computer, motion sensors and rotation sensors to continuously calculate by dead reckoning the position, the orientation, and/or the velocity of the target vehicle 504 without the need for external references.

Those of ordinary skill in the pertinent arts will recognize that the environmental or operational sensors 520 may include any type or form of device or component for determining an environmental condition within a vicinity of the target vehicle 504 in accordance with the present disclosure. For example, the environmental or operational sensors 520 may include one or more air monitoring sensors (e.g., oxygen, ozone, hydrogen, carbon monoxide or carbon dioxide sensors), infrared sensors, ozone monitors, pH sensors, magnetic anomaly detectors, metal detectors, radiation sensors (e.g., Geiger counters, neutron detectors, alpha detectors), attitude indicators, depth gauges, accelerometers or the like, as well as one or more imaging devices (e.g., digital cameras), and are not limited to the sensors 521, 522, 523, 524, 525, 526, 527, 528, 529, 530 shown in FIG. 5.

The ADS-B component 503 may communicate with the environmental or operational sensors 520 and generate ADS-B broadcast data that includes at least position data (e.g., GNSS position). Likewise, the ADS-B component 503 may periodically transmit via the transceiver 516 the ADS-B broadcast data. Alternatively, or in addition thereto, the ADS-B information may be stored in memory and provided at any later point in time.

The sensor or sensors 513 at the station 501 may be any form or type of sensor that is operable to generate sensor data that includes a representation of a target vehicle when the target vehicle is within a field of view of the sensor 513. For example, the sensor may be a digital camera (still or video), such as RGB and/or RGB-depth camera, RADAR sensor, LiDAR sensor, SONAR sensor, etc. While the example illustrated in FIG. 5 shows a single sensor 513 at the station 501, in other implementations, the station 501 may include multiple sensors. For example, multiple sensors 513 may be included at the station 501, each with different orientations such that the multiple sensors provide a 360-degree field of view around the station 501. In other implementations, one or more sensors 513 may be positioned on a movable gimbal or turret such that the orientation may be adjusted so that target vehicles are maintained in the field of view of the sensor 513 at the station 501.

The data processing system 570 at a station 501 may include one or more physical computer servers 572 having one or more computer processors 574 and a plurality of data stores 576 associated therewith, which may be provided for any specific or general purpose. For example, the data processing system 570 of FIG. 5 may be independently provided for the exclusive purpose of receiving, analyzing or storing position data received from the target vehicle and/or sensor data received from one or more sensors 513 at the station 501, and/or other information or data received from the target vehicle 504 or the one or more sensors 513 at the station 501. The servers 572 may be connected to or otherwise communicate with the processors 574 and the data stores 576. The data stores 576 may store any type of information or data, including but not limited to sensor information and/or orientation information relating to the sensor(s) 513 at the station. The servers 572 and/or the computer processors 574 may also connect to or otherwise communicate with the network 580, as indicated by line 578, through the sending and receiving of digital data. For example, the data processing system 570 may include any facilities, stations or locations having the ability or capacity to receive and store information or data, such as media files, in one or more data stores, e.g., media files received from the target vehicle 504, or from one another, or from one or more other external computer systems (not shown) via the network 580. In some implementations, the data processing system 570 may be provided in a physical location. In other such implementations, the data processing system 570 may be provided in one or more alternate or virtual locations, e.g., in a "cloud"-based environment. In still other implementations, the data processing system 570 may be provided onboard one or more aerial vehicles, including but not limited to the target vehicle 504.

The network 580 may be any wired network, wireless network, or combination thereof, and may comprise the Internet in whole or in part. In addition, the network 580 may be a personal area network, local area network, wide area network, cable network, satellite network, cellular telephone network, or combination thereof. The network 580 may also be a publicly accessible network of linked networks, possibly operated by various distinct parties, such as the Internet. In some implementations, the network 580 may be a private or semi-private network, such as a corporate or university intranet. The network 580 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The target vehicle 504 or the data processing system 570 may use any web-enabled or Internet applications or features, or any other client-server applications or features including E-mail or other messaging techniques, to connect to the network 580, or to communicate with one another, such as through short or multimedia messaging service (SMS or MMS) text messages. For example, the target vehicle 504 may be adapted to transmit information or data in the form of synchronous or asynchronous messages to the data processing system 570 or to any other computer device in real time or in near-real time, or in one or more offline processes, via the network 580. Those of ordinary skill in the pertinent art would recognize that the target vehicle 504 or the data processing system 570 may operate any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the processor 512 or the processor 574, or any other computers or control systems utilized by the target vehicle 504 or the data processing system 570, and having sequences of instructions which, when executed by a processor (e.g., a central processing unit, or "CPU"), cause the processor to perform all or a portion of the functions, services and/or methods described herein. Such computer executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

As is discussed above, information or data regarding environmental conditions, operational characteristics or positions may be received from any number of target vehicles, and subsequently provided to a data processing system for processing with sensor data at a station and generation of training data, as discussed herein.

Figure 6:
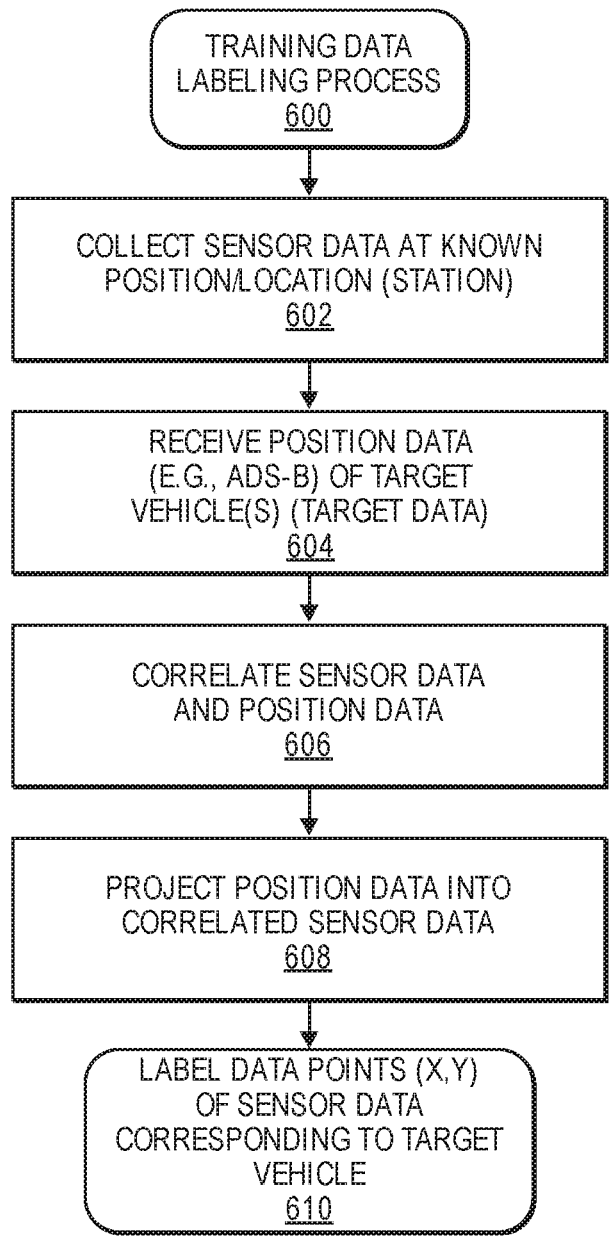
FIG. 6 is an example training data labeling process, in accordance with implementations of the present disclosure.

FIG. 6 is an example training data labeling process 600, in accordance with implementations of the present disclosure. The example process 600 starts with the collection of sensor data from a sensor at a station with a known position and location, as in 602. As discussed above, a station, whether mobile or fixed, may include a GNSS receiver and the position data obtained from the GNSS receiver may be utilized as the known position of the sensor at the station. As is known, GNSS position data also includes a timestamp corresponding to the time at which the GNSS position data was recorded for the station. Likewise, the orientation of the sensor may be determined, for example, based on the heading of the vehicle carrying the station, a compass coupled to the sensor, fixed position information, etc. Still further, in some implementations, sensor information, such as the type of sensor, frame rate, aperture, camera setting, shutter speed, focal length, etc., may also be determined or maintained for the sensor(s) at the station.

In addition to collecting sensor data, position data, such as ADS-B position data is received from one or more target vehicles, as in 604. As the position data is received, or at a later point in time, the position data and sensor data are time correlated using, for example, the timestamp information included in the position data for the sensor and the position data received from the target vehicle, as in 606. For example, GNSS timestamps may be included in both the position data received from the target vehicle and in the sensor data collected from the sensor at the station.

Utilizing time correlated position data and sensor data, the example process projects the position data into the sensor data to determine one or more data points of the sensor data that correspond to or represent the position of the target vehicle, as in 608. In one implementation, the longitude, latitude, and altitude included in the position data received from the target vehicle is transformed into a sensor data format and projected into the coordinates of the sensor data to determined data points of the sensor data that correspond to or represent the target vehicle.

The data points (x, y) of the sensor data corresponding to or representing the target vehicle are then labeled as indicative of the target vehicle, as in 610. The labeling of the data points may include, but is not limited to, including the identifier of the target vehicle, the position of the target vehicle, the track speed of the target vehicle, the ground speed of the target vehicle, the altitude of the target vehicle, range, size, etc.

The labeled sensor data may then be used as training data to train a machine learning system to detect moving objects represented in other sensor data, such as sensor data collected by sensors of an aerial vehicle during operation.

Figure 7:
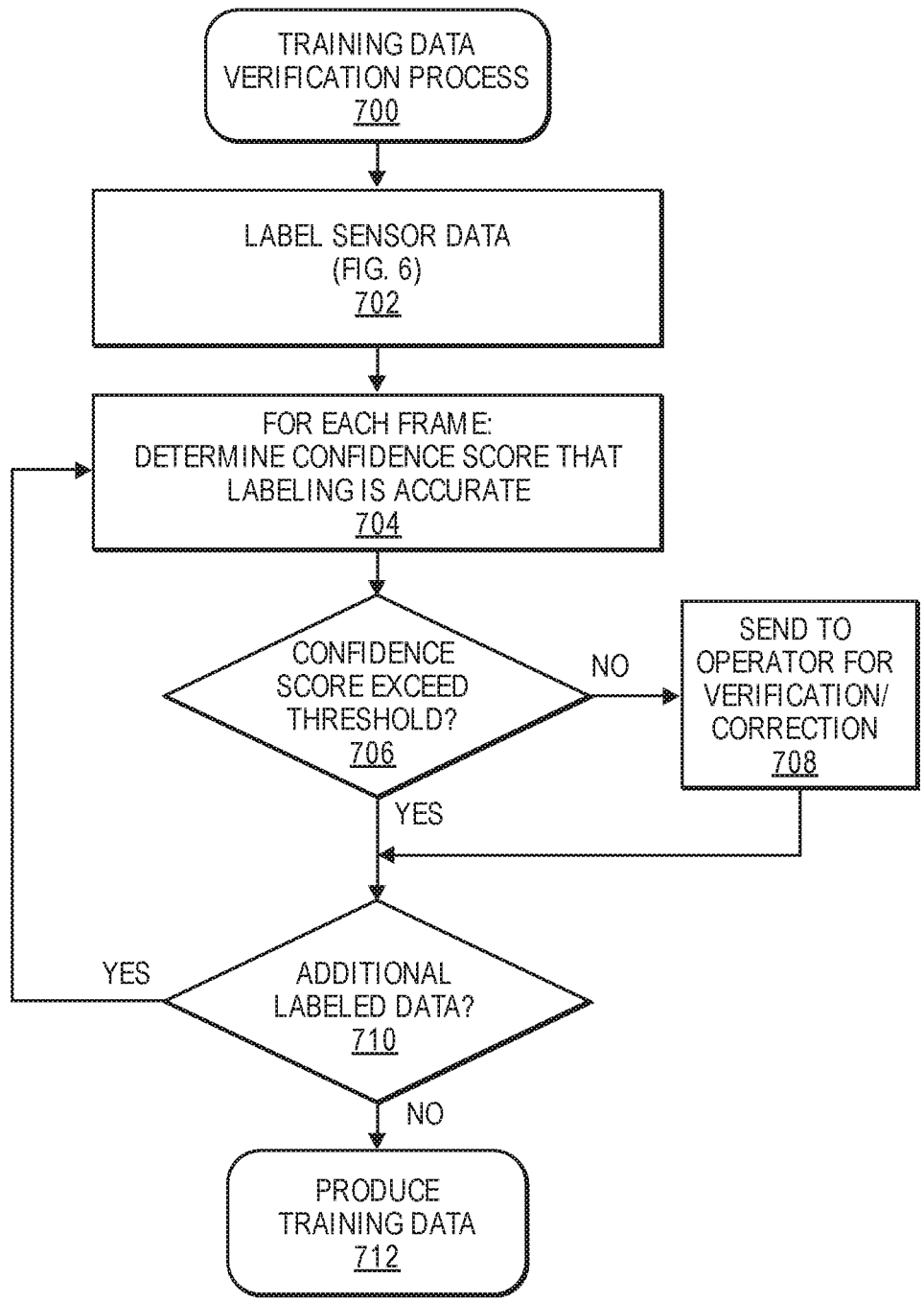
FIG. 7 is an example training data verification process, in accordance with implementations of the present disclosure.

In some implementations, it may be desirable to verify the labeled data prior to the labeled data being used as training data to train a machine learning system. FIG. 7 is an example training data verification process 700, in accordance with implementations of the present disclosure. The example process 700 begins upon completion of the training data labeling process, as in 702, and as discussed above with respect to FIG. 6. For each frame of labeled data, a confidence score may be generated indicating a confidence that the labeling of the data points in the sensor data is correct and that those data points do actually represent the target vehicle, as in 704. A confidence score may be generated by comparing adjacent data point values to determine a difference therebetween, comparing adjacent frames in the data, etc. For example, if the sensor data is an RGB image, the color values of pixels indicated as representing the target vehicle may be compared with color values of adjacent pixels that are not indicated as representing the vehicle. If the color values are similar, such a comparison may decrease the confidence score. In comparison, if there is a large difference in color values, indicating an edge of the target vehicle, the confidence score may be increased. As another example, a size or shape of the target vehicle as represented by the labeled data points of the sensor data may be considered, along with a distance between the known position of the sensor at the station and the position data received from the target vehicle. If the size or shape of the target as represented by the labeled data points corresponds to an expected size or shape of the target vehicle at the distance, the confidence score may be increased. Similarly, if the size or shape of the target vehicle, as represented by the labeled data points does not correspond to the expected size or shape, the confidence score may be decreased. As will be appreciated, there may be any number or combination of algorithms that may be used to determine a confidence score and the ones illustrated above are for explanation purposes only.

Returning to FIG. 7, a determination is then made as to whether the confidence score exceeds a threshold, as in 706. The threshold, may be any defined number or value and may be different for different target vehicles, different sensors, different stations, different times of day, etc.

If it is determined that the confidence score does not exceed the threshold, at least one of the sensor data, the position data, second sensor data that precedes in time the sensor data and/or third sensor data that is subsequent in time to the sensor data is provided to an operator, such as a human, for review and verification or correction, as in 708. In some implementations, the data points of the sensor data that are believed to represent the target vehicle may be identified to the human operator, thereby reducing the review time required by the human operator—i.e., by narrowing down the potential number of data points for consideration.

After receiving verification/correction from the operator, or if it is determined at decision block 706 that the confidence score exceeds the threshold, a determination is made as to whether additional labeled data remains that is to be verified, as in 710. If it is determined that additional labeled data remains for verification, the example process 700 returns to block 704 and continues. However, if it is determined that all labeled data has been verified, training data is produced from the verified labeled data, as in 712.

The described implementations provide a technical improvement over existing systems by increasing the accuracy and speed at which training data that may be used to train a machine learning system to detect moving objects in sensor data is both collected and generated. As discussed above, it is estimated that existing systems require approximately eight-hundred human hours to process and label one hour of image data to produce training data and that such techniques are prone to error, especially when the objects are at long distances. With the described implementations, the processing, labeling and generation of training data may be done in real-time or near real time and often without requiring any human input or review. In addition, when human operator verification is desired or necessary, the time required by the human operator may be greatly reduced and accuracy increased because the example implementations narrow down the potential candidate data points for consideration and/or identify those data points that the example implementations determined represent the target vehicle.

A sufficient corpus of training data may be generated using the above-discussed implementations with little to no involvement of human operators and a machine learning system may be trained based on the training data that is able to detect moving objects represented in sensor data generated by sensors of any of a variety of vehicles during operation of those vehicles. Such object detection is critical for autonomous navigation and object avoidance.

A machine learning system, such as a supervised machine learning system, may be trained with the training data using one or more machine algorithms or techniques such as nearest neighbor methods or analyses, factorization methods or techniques, K-means clustering analyses or techniques, similarity measures such as log likelihood similarities or cosine similarities, latent Dirichlet allocations or other topic models, or latent semantic analyses. The machine learning system may thus result in an object model configured to detect a moving object represented in sensor data. In some implementations, the machine learning system may reside and/or be operated on one or more centrally located computing devices or machines, or in alternate or virtual locations, e.g., a "cloud"-based environment. In some other implementations, the machine learning system being trained may reside and/or be operated on one or more computing devices or machines provided onboard one or more aerial vehicles from which the data regarding the environmental conditions or the operational characteristics were captured and on which the emitted sound pressure levels and/or frequencies were determined.

Figure 8:
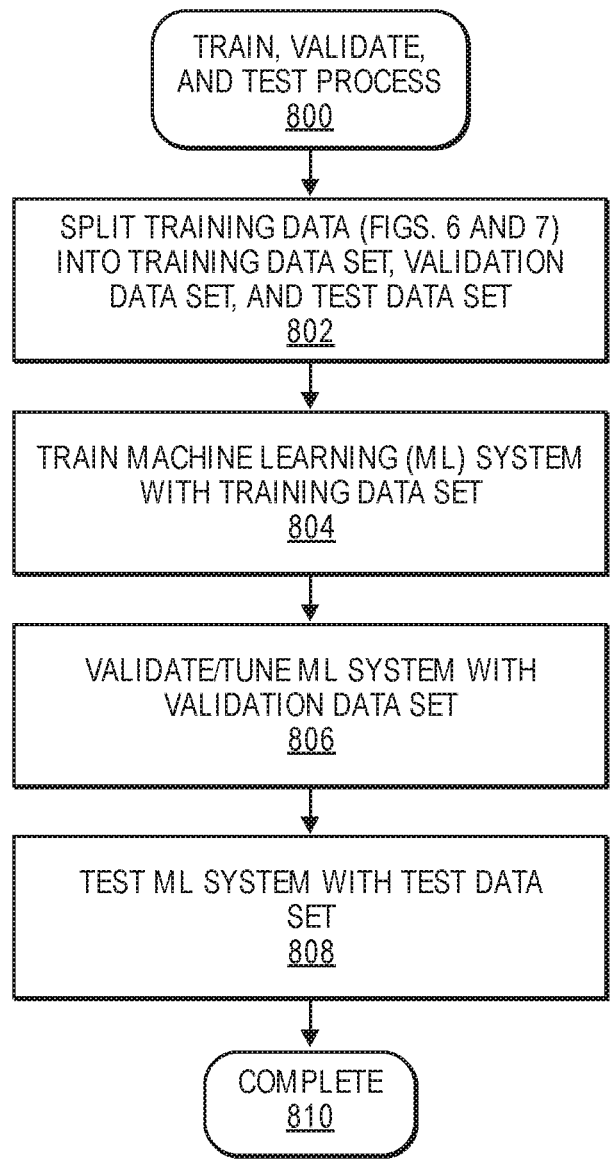
FIG. 8 is an example train, validate, and test process, in accordance with implementations of the present disclosure.

FIG. 8 is an example train, validate, and test process 800, in accordance with implementations of the present disclosure. The example process may utilize the labeled data generated as part of the example process 600 (FIG. 6) and/or the training data produced as part of the example process 700 (FIG. 7), generally referred to in this example as labeled training data. At an initial point, the labeled training data is split into a training data set, validation data set, and test data set, as in 802. Splitting the data into different sets allows for the training of the machine learning system with the training data set without biasing the system based on the validation data set and/or the test data set.

Utilizing the training data set, the machine learning system is trained or fit to the training data set, as in 804. Any type of machine learning system, such as a supervised machine learning system may be trained using techniques that are known in the art and need not be discussed in detail herein.

After training of the machine learning system, image data of the validation data set, without the labels, may be provided to the machine learning system and the machine learning system may label the validation data, as in 806. As the outputs are provided by the machine learning system, the results may be compared to the labeled data to validate the training of the machine learning system, and the machine learning system may be further tuned. Likewise, based on the results, it may be further determined what types of additional labeled data needs to be produced by the disclosed implementations to provide as further training data to continue to refine or tune the machine learning system.

Finally, the image data from the test data set may be provided to the machine learning system to test the accuracy of the machine learning system, as in 808. Specifically, the image data of the test data set may be provided as inputs to the machine learning system and the outputs produced by the machine learning system may be compared with the labels corresponding to the image data to determine an accuracy of the trained machine learning system. The example process 800 then completes, as in 810.

Figure 9:
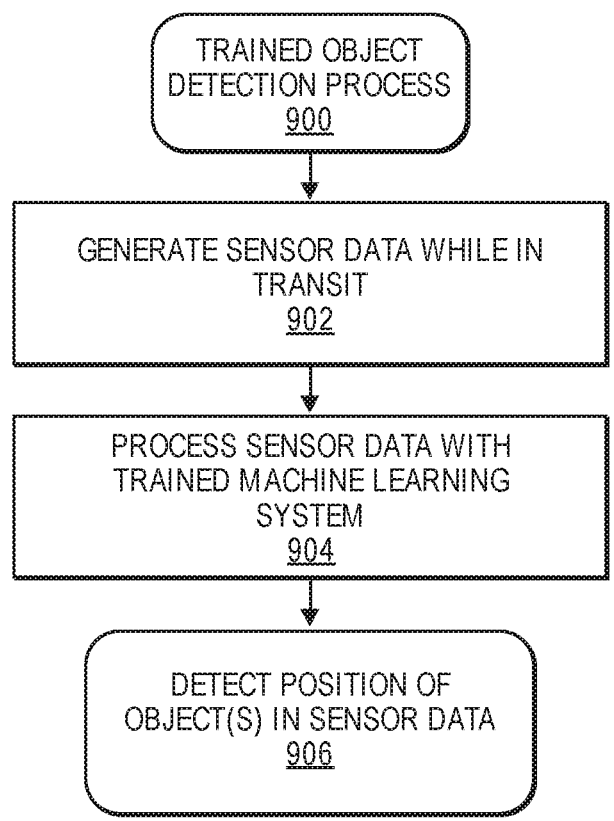
FIG. 9 is an example trained object detection process, in accordance with implementations of the present disclosure.

FIG. 9 is an example trained object detection process 900, in accordance with implementations of the present disclosure. The example process 900 beings when sensor data from a sensor of a vehicle, such as an aerial vehicle, is generated while the vehicle is in operation or transit, as in 902. Similar to the above, the sensor data may be generated by any type of sensor that is coupled to the aerial vehicle, such as a camera, RADAR, LiDAR, SONAR, etc. As the sensor data is generated, the sensor data may be provided as an input to the trained machine learning system, as in 904. The trained machine learning system may be local to the vehicle or remote from the vehicle. If remote from the vehicle, the vehicle may transmit the sensor data to a remote location of the machine learning system.

The trained machine learning system, upon receiving the sensor data, may process the sensor data alone or in combination with ADS-B information received from other vehicles, to detect the position of any moving objects represented in the sensor data, as in 906. Such detection may be performed in real-time or near real-time. Likewise, such detection of moving objects be used by other systems of the aerial vehicle to track or monitor the moving object, alter the course of the aerial vehicle to avoid the moving object, etc.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

For example, although some of the implementations disclosed herein reference the use of aerial vehicles, those of ordinary skill in the pertinent arts will recognize that the systems and methods disclosed herein are not so limited, and may be utilized in connection with any type or form of vehicle (e.g., manned or unmanned) such as ground based vehicles, water based vehicles, etc.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the processes represented in the flow charts of FIG. 6, 7, 8, or 9, orders in which such methods or processes are presented are not intended to be construed as any limitation on the claimed implementations, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A system to generate training data for machine learning, comprising:
   a target vehicle, including:
      a first position tracking component that determines a position of the target vehicle as the target vehicle navigates a route and generates position data for the target vehicle; and
      a transmitter configured to transmit the position data;
   a station, including:
      an antenna configured to receive the position data from the target vehicle;
      a camera at a known position and orientation, the camera configured to generate image data that includes a representation of the target vehicle when the target vehicle is within a field of view of the camera;
      one or more processors; and
      a memory storing program instructions that when executed by the one or more processors cause the one or more processors to at least:
         correlate the position data and the image data;
         determine, based at least in part on the correlated position data and the image data, one or more pixels of the image data corresponding to the target vehicle; and
         label the one or more pixels as the target vehicle to produce training data that includes the image data and the label of the one or more pixels.

2. The system of claim 1, wherein the program instructions, when executed by the one or more processors, further cause the one or more processors to at least:
   provide the training data as an input to a machine learning system to train the machine learning system.

3. The system of claim 1, wherein the program instructions, when executed by the one or more processors to correlate the position data and the image data, further cause the one or more processors to at least:
   determine a first timestamp of the image data produced by a Global Navigation Satellite System (GNSS) and received at the station;
   determine a second timestamp of the position data produced by the GNSS; and
   correlate the position data and the image data based on the first timestamp and the second timestamp.

4. The system of claim 1, wherein the program instructions, when executed by the one or more processors, further cause the one or more processors to at least:
   determine a confidence score that the one or more pixels of the image data actually represent the target vehicle;
   determine that the confidence score exceeds a threshold; and
   in response to a determination that the confidence score exceeds the threshold, produce the training data.

5. A computer implemented method to produce training data, comprising:
   receiving, at a station and from a target vehicle, position data of the target vehicle that includes at least a latitude, a longitude, and an altitude of the target vehicle at a first time, wherein the station is independent of the target vehicle;
   generating, with a sensor at a known position at the station and at the first time, sensor data that includes a representation of the target vehicle;
   correlating the position data and the sensor data;
   determining, based at least in part on the correlated position data and the sensor data, one or more data points of the sensor data corresponding to the target vehicle; and
   labeling the one or more data points to produce the training data that includes the sensor data and the label of the one or more data points.

6. The computer implemented method of claim 5, wherein correlating is based at least in part on the first time.

7. The computer implemented method of claim 5, wherein:
   the position data is received in real-time or near real-time as the target vehicle navigates; or
   the position data is recorded by the target vehicle and provided at a later point in time.

8. The computer implemented method of claim 5, wherein:
   the target vehicle is at least one of an aerial vehicle, a ground based vehicle, or a water based vehicle; and
   the sensor is positioned at a station.

9. The computer implemented method of claim 8, wherein the station is at a fixed location on earth.

10. The computer implemented method of claim 8, wherein:
    the station is included in a second vehicle; and
    the known position of the sensor is determined based at least in part on a Global Navigation Satellite System (GNSS) of the second vehicle.

11. The computer implemented method of claim 5, further comprising:
    determining a confidence score that the one or more data points of the sensor data actually represent the target vehicle;
    determining that the confidence score exceeds a threshold; and
    in response to determining that the confidence score exceeds the threshold, producing the training data.

12. The computer implemented method of claim 5, further comprising:
    determining a confidence score that the one or more data points of the sensor data actually represent the target vehicle;
    determining that the confidence score does not exceed a threshold;
    providing, to an operator, at least one of the position data, the sensor data, a second sensor data that precedes in time the sensor data, or a third sensor data that is subsequent in time to the sensor data;
receiving, from the operator, a verification that the one or more data points of the sensor data actually represent the target vehicle; and
in response to receiving the verification from the operator, producing the training data.

13. The computer implemented method of claim 5, further comprising:
providing the training data as an input to a machine learning system as training inputs to train the machine learning system to detect vehicles in sensor data.

14. The computer implemented method of claim 5, wherein determining the one or more data points of the sensor data further includes:
projecting the position data into the sensor data to determine data points of the sensor data that coincide with the projection of the position data.

15. A system, comprising:
a station, including:
a sensor at a known position, the sensor configured to generate sensor data that includes a representation of a target vehicle, wherein the station is independent of the target vehicle;
one or more processors; and
a memory storing program instructions that when executed by the one or more processors cause the one or more processors to at least:
receive, from the target vehicle, position data of the target vehicle;
correlate the position data and the sensor data;
determine, based at least in part on the correlated position data and the sensor data, one or more data points of the sensor data corresponding to the target vehicle; and
label the one or more data points as the target vehicle to produce training data that includes the sensor data and the label of the one or more data points.

16. The system of claim 15, wherein the program instructions, when executed by the one or more processors further cause the one or more processors to at least:
determine a shape of the target vehicle as represented in the sensor data; and
wherein the label of the one or more data points further indicates the shape of the target vehicle.

17. The system of claim 15, wherein the program instructions, when executed by the one or more processors further cause the one or more processors to at least:
separate the training data into a training data set, a validation data set, and a test data set;
train a machine learning system based at least in part on the training data set;
subsequent to training the machine learning system:
validate the machine learning system based at least in part on the validation data set; and
test the machine learning system based at least in part on the test data set.

18. The system of claim 17, wherein the program instructions, when executed by the one or more processors further cause the one or more processors to at least:
determine, based at least in part on the validation of the machine learning system, additional training data to be collected to further train or tune the machine learning system.

19. The system of claim 15, wherein:
the station is included on a second vehicle;
the second vehicle includes:
a position tracking component that determines a position of the second vehicle as the second vehicle navigates and generates second position data for the second vehicle; and
the target vehicle includes:
a second station, including:
a second sensor at a second known position, the second sensor configured to generate second sensor data that includes a second representation of the second vehicle;
one or more second processors; and
a second memory storing second program instructions that when executed by the one or more second processors cause the one or more second processors to at least:
determine, based at least in part on the second position data and the second sensor data, one or more second data points of the second sensor data corresponding to the second vehicle; and
label the one or more second data points as the second vehicle to produce second training data that includes the second sensor data and a second label of the one or more second data points.

20. The system of claim 19, wherein the training data and the second training data are provided to a machine learning system as training inputs to at least one of train the machine learning system to detect objects in sensor data, validate the machine learning system, or test the machine learning system.

* * * * *